2,687,343

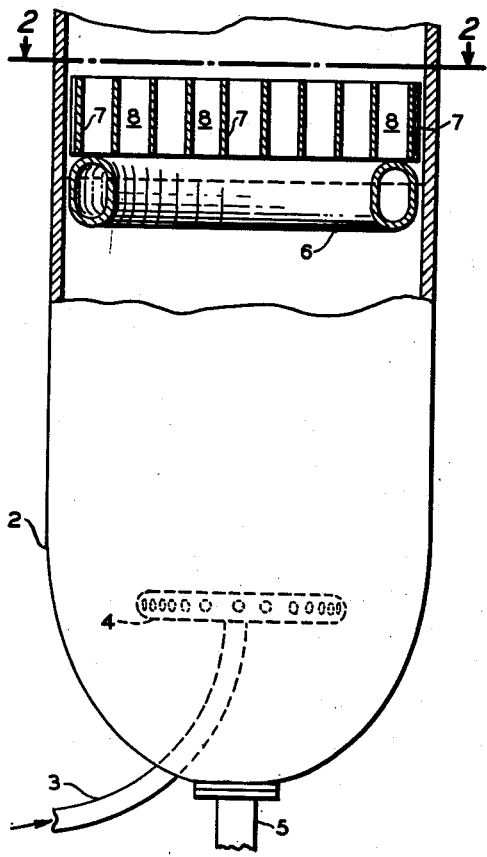
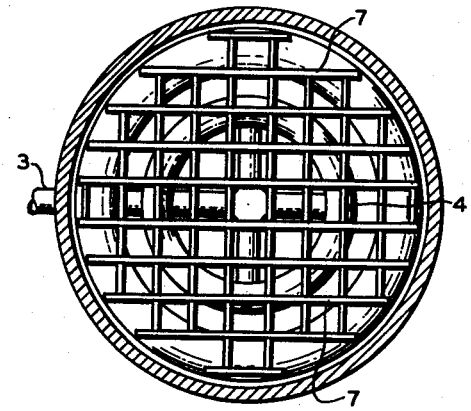
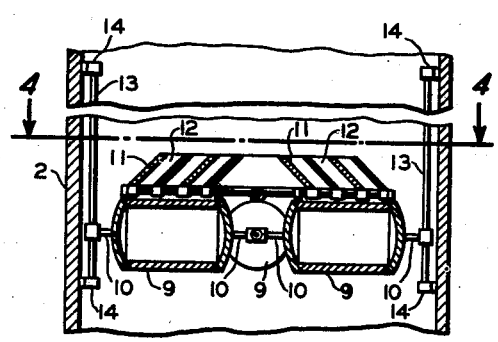
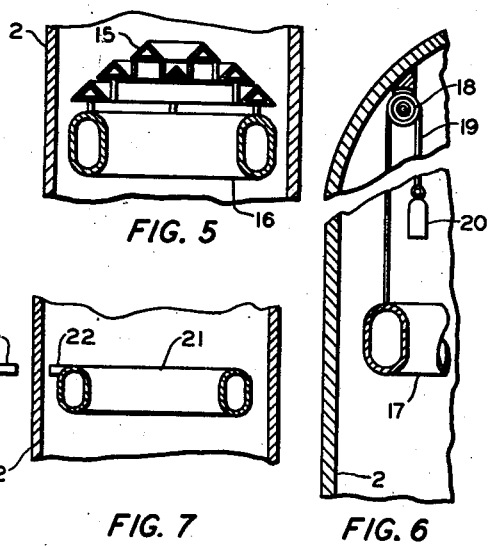
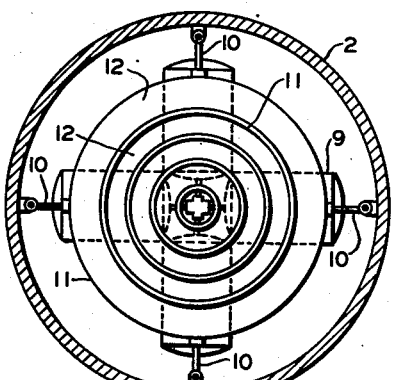
FIG. 1  FIG. 2  FIG. 3  FIG. 4  FIG. 5  FIG. 6  FIG. 7
INVENTOR.
J.A. CRASK
R.L. McINTIRE
BY
ATTORNEYS Patented Aug. 24, 1954

UNITED STATES PATENT OFFICE 2,687,343

FLUIDIZED BED FLOATING BAFFLE

James A. Crask, Kansas City, Kans., and Robert L. McIntire, Bartlesville, Okla., assignors to Phillips Petroleum Company, a corporation of Delaware Application December 19, 1949, Serial No. 133,835

4 Claims. (Cl. 23—288)

This invention relates to a method and apparatus for controlling a so-called fluidized bed operation as practiced, for example, in the catalytic conversion of hydrocarbons. In one of its aspects, this invention relates to a method and apparatus which permits a control of the so-called "interface" or surface of a fluidized bed of particulate solid material to minimize entrainment or loss from said bed into the less dense or light phase above the bed and, ultimately, from the apparatus. In one of its embodiments, the invention provides a method which employs a buoyant float or pontoon which "floats" on the fluidized bed of particles, for example, hydrocarbon conversion catalyst particles, as is more fully described below.

It has been found, according to this invention, that it is possible to actually suspend or float in a bed of fluidized solid particles a suitably constructed buoyant object, for example, a float or pontoon. Further it has been found that more than one float on pontoon can be employed, preferably connected together by means of rods or equivalent means. Thus, it has been found that the mere presence of a buoyant object in the fluidized bed of solid particles will tend to prevent entrainment and loss of solid particles from said bed. Also, the float or pontoon, or connected floats or pontoons, can be equipped with suitable baffles to further assist in defining the so-called "interface" which can be said to exist between the light and dense phase of the fluidized particles, as more fully described below.

Fluidized solid particle beds are employed, as stated, in various arts, for example in the catalytic conversion arts, illustrative of which is the conversion of hydrocarbons or hydrocarbon oils. In such conversions, the fluidized catalyst is sought to be maintained in a dense phase in a reactor. The so-called "interface," which is the area of transition from the dense to the light phase of fluidized particles, is usually maintained somewhat below the outlet of the reactor so that the loss or entrainment from the bed and from the reactor of particles which are in violent motion therein is minimized. It has been found that the employment of a float according to this invention permits greater latitude in the depth of bed of dense phase particles which can be maintained in any given reactor. Specifically, the method of this invention, employing the apparatus of this invention, permits operation of a high dense phase level of particles without increase of the quantity of particles entrained or otherwise lost from the reactor, as in the prior art. It has also been found that such a float as described herein can be employed to indicate the quantity of catalyst or other fluidized particles in a fluidized bed in a manner described herein below.

An object of this invention is to provide a method and apparatus for controlling the motion, or reducing the turbulence at the surface, of a bed of fluidized particles within a bed of said particles disposed in a reaction or other zone. Another object of this invention is to provide a mechanical means which coacts with a fluidized bed of particles to control the quantity of entrainment or loss from the "interface" between the dense and light phases of said particles. A still further object of the invention is to provide a method and apparatus which will indicate the quantity of particulate material in a fluidized bed of such material.

Further objects as well as advantages of this invention are apparent from a study of this disclosure, the drawing and the claims.

Thus according to this invention, there are provided a method and apparatus for exerting a control upon the "interface" between the dense and light phases of a fluidized bed of particles which comprises buoying or floating an object of size considerably greater than the size of said particles in said bed of said particles. The object which can be floated suitably comprises a float or floats connected together and preferably equipped with baffles. Further, according to this invention, there are provided a method and apparatus for indicating the quantity, or change in quantity, of particulate material in a fluidized bed of such material which comprises floating an object, as aforesaid, in said bed, said object being equipped with a level indicating means.

To more fully describe the invention, there are illustrated in the several figures of the drawing several types of floats according to this invention. Obviously, other equivalent mechanical arrangements will be obvious to those skilled in the art upon a perusal of this specification, the drawing and the claims. In the drawing, Figure 1 is a vertical profile, partly in cross section, of a vessel adapted to contain a fluidized bed of particulate material and a float, equipped with baffles, according to this invention. Figure 2 is a cross section of Figure 1 taken horizontally at a point above the float and baffles, namely at plane 2—2. Figure 3 is a vertical cross section showing a float and baffles of a construction different from that shown in Figures 1 and 2, and also shows guide rods adapted to guide and to limit the movement of said float. Figure 4 is a cross section of Figure 3 taken horizontally along plane 4—4. Figure 5 is a vertical cross section of a construction different from that of the baffles shown in the preceding figures. Figure 6 illustrates one method of reducing the effective weight of a float, according to this invention, thus, in effect, increasing its buoyancy. Finally, Figure 7 is a vertical cross sectional view of a float equipped to indicate the level and quantity of fluidized particulate material within a vessel.

Referring now to Figure 1, there is shown the lower portion of a vessel or reactor 2, in which is maintained a fluidized bed of particulate material, for example a hydrocarbon conversion catalyst. A mixture of fluidized catalyst and hydrocarbon vapor is fed into vessel 2 through conduit 3 and perforated ring 4. Catalyst is withdrawn from the vessel through conduit 5. Converted hydrocarbon vapor is taken off overhead through a conduit, not shown. Owing to the turbulence at the "interface" of the catalyst some catalyst particles will be carried out from the vessel by the hydrocarbon vapors which are being withdrawn overhead. It has been the practice in the art to recover entrained catalyst by means of cyclone separators or precipitators and by other methods or means. The reintroduction of the catalyst entrained overhead and recovered as stated poses problems with which those skilled in the art are familiar. According to this invention, as stated, there is provided a float or pontoon 6, preferably equipped with baffles or baffle structure 7, which is shown in Figure 1.

Float 7 is composed of a grid made of plates disposed substantially on end and joined together at right angles to each other thereby forming vertical slots or channels 8 through which ascending catalyst particles must pass. In passing through channels 8 the turbulence of any entrained particles will be substantially reduced, resulting in the dropping back or precipitation of said particles from the upwardly moving hydrocarbon vapor.

In Figure 3, floats 9, joined together by rods 10, are equipped with baffles 11, which in this case are in the shape of a frustum of a cone and are placed one within the other, in the same plane, thereby forming annular channels 12, through which ascending particulate material must pass. Also shown in Figure 3 are guide rods 13 equipped with abutting members 14. Guide rods 13 guide and limit the motion of the float and are so placed as to ensure that the float will operate substantially at or sufficiently near the desired "interface" level of particulate material within vessel 2. Figure 4, as stated, is a cross sectional view of Figure 3 taken along plane 4—4. Figure 5 illustrates a pyramiding of annular baffles 15, upon float 16, which are of progressively diminishing diameter and which, as shown, have a triangular cross section. In Figure 6, float 17 is counterbalanced by means of pulley 18, wire 19 and weight 20. This modification of the invention is of particular advantage when the dense phase of the particulate material is unusually light, say, 20 to 30 pounds per cubic foot. Preferably, the counterbalancing weights should be arranged to remain above the "interface" at all times to avoid disturbance of the fluidized bed.

Figure 7 shows a float 21 which may be constructed like any of the other floats shown in the drawing, or in manenr equivalent thereto. A capsule of radioactive material 22 is mounted upon the float, in convenient manner, and detector 23 is stationed outside vessel 2, thus providing a means, according to the invention, for indicating the "interface" level by indicating the position of the float. In present practice, differential pressure taps are employed to determine the position of the level of the "interface" between the dense and light phases of particulate material, thus to determine whether or not additional material should be added to replace that lost by entrainment in the gas or vapor leaving the vessel.

Reasonable variation and modification are possible within the scope of the foregoing disclosure, drawing and claims to the invention the essence of which is that a suitable object buoyed or floated in or on a fluidized bed of particles can be employed to control the motion of said particles and/or to prevent entrainment or loss from the dense phase of the said particles to the light phase of said particles and, therefore, from the apparatus substantially as described, and also that means may be placed upon said float for indicating at a point without the bed the position or level of the "interface" thereof.

We claim:

1. An apparatus for controlling entrainment of solid particles in a bed of solid particles maintained in a fluidized state in an upright substantially cylindrical vessel by the flow of vapors therethrough which comprises: a first hollow tubular ring whose outside diameter is less than the inside diameter of the vessel containing said bed of solid particles, and disposed within said vessel; a second tubular ring whose outside diameter is less than the inside diameter of said first tubular ring, said second ring being disposed concentrically within said first ring, and a baffle member supported upon and secured to said tubular rings, said baffle member comprising a grid made of plates disposed substantially on edge and joined together at right angles to each other thereby forming channels through which ascending solid particles must pass.

2. An apparatus for controlling entrainment of solid particles in a bed of solid particles maintained in a fluidized state in a vessel by the flow of vapors therethrough which comprises a plurality of hermetically sealed, hollow, cylindrical bodies joined together in a horizontal plane at about the axial center of the vessel containing said fluidized bed of particles; baffle members supported upon and secured to said cylindrical bodies, said baffle members comprising hollow, frusto-conical sections placed inside each other so as to form channels through which ascending solid particles must pass; and guide members secured to the sides of said vessel and slidably connected to said cylindrical bodies so that said cylindrical bodies and baffles are free to move upwardly and downwardly.

3. In apparatus for controlling entrainment of solid particles in a bed of solid particles maintained in a fluidized state in an upright substantially cylindrical vessel by the flow of vapors therethrough, the improvement which comprises float means disposed within said vessel; and baffle means supported upon and secured to said float and comprising a grid comprising a multiplicity of wholly confined channels through which ascending solid particles from below said float must pass, said grid being made of plates disposed substantially on edge and joined together to form said channels.

4. In apparatus for controlling entrainment of solid particles in a bed of solid particles maintained in a fluidized state in a vessel by the flow of vapors therethrough, the improvement which comprises at least one buoyant pontoon member; and a plurality of upwardly extending baffle members supported upon and secured to said buoyant pontoon member so as to form wholly confined channels between said members through which ascending particles from below said pontoon member must pass.

References Cited in the file of this patent

UNITED STATES PATENTS

| Number | Name | Date |
|---|---|---|
| 480,309 | Willan | Aug. 9, 1892 |
| 996,545 | Warner | June 27, 1911 |
| 1,042,894 | Crull et al. | Oct. 29, 1912 |
| 1,616,547 | Pontoppidan | Feb. 8, 1927 |
| 2,427,112 | Tyson | Sept. 9, 1947 |
| 2,455,561 | Creelman | Dec. 7, 1948 |
| 2,456,233 | Wolf | Dec. 14, 1948 |

FOREIGN PATENTS

| Number | Country | Date |
|---|---|---|
| 10,992 | Great Britain | 1905 |